(12) United States Patent
Steele et al.

(10) Patent No.: US 8,863,399 B2
(45) Date of Patent: Oct. 21, 2014

(54) TAPE MEASURE

(75) Inventors: Michael S. Steele, Waukesha, WI (US);
Steven W. Hyma, Milwaukee, WI (US);
Wade F. Burch, Wauwatosa, WI (US);
Cheng Zhang Li, Colgate, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 235 days.

(21) Appl. No.: 13/594,331

(22) Filed: Aug. 24, 2012

(65) Prior Publication Data

US 2013/0047455 A1 Feb. 28, 2013

Related U.S. Application Data

(60) Provisional application No. 61/527,964, filed on Aug. 26, 2011.

(51) Int. Cl.
*G01B 3/10* (2006.01)

(52) U.S. Cl.
CPC .................................. *G01B 3/1082* (2013.01)
USPC ........................................... 33/755; 33/679.1

(58) Field of Classification Search
CPC .......... G01B 3/004; G01B 3/006; G01B 3/10; G01B 3/1082
USPC ......................... 33/494, 679.1, 755, 759, 760
See application file for complete search history.

(56) References Cited

U.S. PATENT DOCUMENTS

| 14,947 A | 5/1856 | Buck et al. |
|---|---|---|
| 1,303,756 A | 5/1919 | Ballou |
| 1,613,676 A | 1/1927 | Raphael |
| 2,052,259 A | 8/1936 | Stowell |
| 2,156,905 A | 5/1939 | Stowell et al. |
| 2,574,272 A | 11/1951 | McCully |
| 2,614,769 A | 10/1952 | Nicholson |
| 2,683,933 A | 7/1954 | McFarland |

(Continued)

FOREIGN PATENT DOCUMENTS

| CN | 2174684 | 8/1994 |
|---|---|---|
| EP | 66322 | 10/1986 |

(Continued)

OTHER PUBLICATIONS

Hyun-Kyu Ko, "A Study on Design of Measure Tape for Home Use (for DYI)" (1996) Master's Thesis-Kyung Sung University, Graduate School of Industry, Department of Industrial Design, 658.04 4 (81 pages with English translation).

*Primary Examiner* — G. Bradley Bennett
(74) *Attorney, Agent, or Firm* — Michael Best & Friedrich LLP

(57) ABSTRACT

A tape measure includes a housing assembly defining a cavity and a tape port. A measuring tape is selectively extendable and retractable from the tape port. The measuring tape includes a spool portion disposed within the cavity and an end portion. A top surface extends from the end portion to the spool portion, and a bottom surface extends from the end portion to the spool portion opposite the top surface. A hook member is fixedly coupled to a end portion of the measuring tape. A first measurement scale is defined on the top surface and includes indicia having a first orientation relative to a longitudinal tape axis. The bottom surface includes a second measurement scale with indicia having a second orientation relative to the longitudinal tape axis. The second orientation is substantially opposite the first orientation.

12 Claims, 4 Drawing Sheets

(56) References Cited

U.S. PATENT DOCUMENTS

| | | |
|---|---|---|
| 2,816,369 A | 12/1957 | Becker |
| 2,994,958 A | 8/1961 | Beeber |
| 3,100,937 A | 8/1963 | Burch |
| 3,164,907 A | 1/1965 | Quenot |
| 3,214,836 A | 11/1965 | West |
| 3,499,225 A | 3/1970 | Darrah |
| 3,499,612 A | 3/1970 | Zelnick |
| 3,519,219 A | 7/1970 | Zelnick |
| 3,519,220 A | 7/1970 | Zelnick |
| 3,521,831 A | 7/1970 | Schmidt |
| 3,570,782 A | 3/1971 | Hayes |
| 3,577,641 A | 5/1971 | Smith |
| 3,578,259 A | 5/1971 | Zelnick |
| 3,672,597 A | 6/1972 | Williamson |
| 3,713,603 A | 1/1973 | Shore |
| 3,716,201 A | 2/1973 | West |
| 3,816,925 A | 6/1974 | Hogan et al. |
| 3,838,520 A | 10/1974 | Quenot |
| 3,869,096 A | 3/1975 | Hogan et al. |
| 3,874,608 A | 4/1975 | Quenot |
| 3,905,114 A | 9/1975 | Rutty |
| 3,908,277 A | 9/1975 | Rutty |
| 3,918,657 A | 11/1975 | Hawker et al. |
| 3,942,738 A | 3/1976 | Rutty |
| 4,067,513 A | 1/1978 | Rutty et al. |
| 4,077,128 A | 3/1978 | Stoutenberg |
| D247,878 S | 5/1978 | Covey |
| 4,103,426 A | 8/1978 | Robin |
| 4,121,785 A | 10/1978 | Quenot |
| 4,131,244 A | 12/1978 | Quenot |
| 4,142,693 A | 3/1979 | Czerwinski |
| 4,149,320 A | 4/1979 | Troyer et al. |
| 4,153,996 A | 5/1979 | Rutty |
| 4,161,781 A | 7/1979 | Hildebrandt et al. |
| 4,164,334 A | 8/1979 | Rathbun et al. |
| 4,164,816 A | 8/1979 | Bergkvist |
| D253,876 S | 1/1980 | Covey |
| D253,877 S | 1/1980 | Covey et al. |
| 4,186,490 A | 2/1980 | Quenot |
| 4,200,983 A | 5/1980 | West et al. |
| 4,215,828 A | 8/1980 | Rathbun et al. |
| 4,215,829 A | 8/1980 | Boyllin |
| D256,894 S | 9/1980 | Bruno |
| D257,008 S | 9/1980 | Hildebrandt |
| 4,286,387 A | 9/1981 | Di Diego |
| 4,288,923 A | 9/1981 | Duda |
| 4,363,171 A | 12/1982 | Scandella |
| 4,411,072 A | 10/1983 | Rutty et al. |
| 4,427,883 A | 1/1984 | Betensky et al. |
| 4,429,462 A | 2/1984 | Rutty et al. |
| 4,433,486 A | 2/1984 | Muehlenbein |
| 4,434,952 A | 3/1984 | Czerwinski et al. |
| 4,449,302 A | 5/1984 | Drechsler et al. |
| 4,462,160 A | 7/1984 | Cohen et al. |
| 4,476,635 A | 10/1984 | Hart |
| 4,479,617 A | 10/1984 | Edwards |
| 4,487,379 A | 12/1984 | Drechsler et al. |
| 4,489,494 A | 12/1984 | Duda |
| 4,516,325 A | 5/1985 | Cohen et al. |
| D279,553 S | 7/1985 | Drechsler |
| 4,527,334 A | 7/1985 | Jones et al. |
| 4,547,969 A | 10/1985 | Haack |
| 4,574,486 A | 3/1986 | Drechsler |
| 4,578,867 A | 4/1986 | Czerwinski et al. |
| 4,583,294 A | 4/1986 | Hutchins et al. |
| 4,603,481 A | 8/1986 | Cohen et al. |
| 4,619,020 A | 10/1986 | Lecher, Sr. |
| 4,748,746 A | 6/1988 | Jacoff |
| 4,811,489 A | 3/1989 | Walker |
| 4,860,901 A | 8/1989 | Hochreuther et al. |
| 4,896,280 A | 1/1990 | Phillips |
| 4,930,227 A | 6/1990 | Ketchpel |
| 4,965,941 A | 10/1990 | Agostinacci |
| 4,972,601 A | 11/1990 | Bickford et al. |
| 4,982,910 A | 1/1991 | Bickford |
| 4,998,356 A | 3/1991 | Chapin |
| 5,010,657 A | 4/1991 | Knapp |
| 5,038,985 A | 8/1991 | Chapin |
| 5,046,339 A | 9/1991 | Krell |
| 5,062,215 A | 11/1991 | Schlitt |
| 5,134,784 A | 8/1992 | Atienza |
| D333,628 S | 3/1993 | Piotrkowski |
| 5,189,801 A | 3/1993 | Nicely |
| 5,208,767 A | 5/1993 | George-Kelso et al. |
| 5,210,956 A | 5/1993 | Knispel et al. |
| 5,230,158 A | 7/1993 | Wall |
| D342,210 S | 12/1993 | Grossman |
| D342,459 S | 12/1993 | Shen |
| D342,687 S | 12/1993 | Kang |
| 5,335,421 A | 8/1994 | Jones, Jr. |
| D350,703 S | 9/1994 | Fifer |
| 5,367,785 A | 11/1994 | Benarroch |
| 5,448,837 A | 9/1995 | Han-Teng |
| D365,769 S | 1/1996 | Kang |
| 5,481,813 A | 1/1996 | Templeton |
| 5,506,378 A | 4/1996 | Goldenberg |
| 5,531,395 A | 7/1996 | Hsu |
| 5,542,184 A | 8/1996 | Beard |
| D375,269 S | 11/1996 | Wertheim |
| 5,575,077 A | 11/1996 | Tae |
| 5,600,894 A | 2/1997 | Blackman et al. |
| 5,659,970 A | 8/1997 | Reedy |
| 5,699,623 A | 12/1997 | Lee |
| 5,746,004 A | 5/1998 | Wertheim |
| D396,816 S | 8/1998 | Kang |
| D397,304 S | 8/1998 | Kang |
| 5,791,581 A | 8/1998 | Loeffler et al. |
| 5,794,357 A | 8/1998 | Gilliam et al. |
| D397,626 S | 9/1998 | Davis |
| D397,950 S | 9/1998 | Blackman |
| 5,806,202 A | 9/1998 | Blackman et al. |
| 5,815,940 A | 10/1998 | Valentine, Sr. |
| 5,820,057 A | 10/1998 | Decarolis et al. |
| 5,829,152 A | 11/1998 | Potter et al. |
| D402,216 S | 12/1998 | Gilliam |
| 5,842,284 A | 12/1998 | Goldman |
| 5,875,557 A | 3/1999 | Ueki |
| 5,884,408 A | 3/1999 | Simmons |
| 5,894,677 A | 4/1999 | Hoffman |
| 5,895,539 A | 4/1999 | Hsu |
| D409,104 S | 5/1999 | Yang |
| 5,913,586 A | 6/1999 | Marshall |
| 5,922,999 A | 7/1999 | Yang |
| D412,858 S | 8/1999 | Staton |
| 5,990,435 A | 11/1999 | Chao |
| 6,011,472 A | 1/2000 | Pendergraph |
| D420,606 S | 2/2000 | Hsu |
| D421,230 S | 2/2000 | Gilliam |
| 6,026,585 A | 2/2000 | Li |
| 6,032,379 A | 3/2000 | Usami |
| D423,382 S | 4/2000 | Piotrkowski |
| 6,052,914 A | 4/2000 | Soon |
| D424,454 S | 5/2000 | Ikeda |
| 6,082,017 A | 7/2000 | Simar |
| 6,085,433 A | 7/2000 | Li |
| 6,098,303 A | 8/2000 | Vogel |
| 6,108,926 A | 8/2000 | Fraser et al. |
| 6,115,933 A | 9/2000 | Li |
| RE36,887 E | 10/2000 | Goldman |
| 6,148,534 A | 11/2000 | Li |
| 6,161,299 A | 12/2000 | Lin |
| 6,167,635 B1 | 1/2001 | Lin |
| 6,178,655 B1 | 1/2001 | Potter et al. |
| D438,478 S | 3/2001 | Lin |
| D439,531 S | 3/2001 | Davis et al. |
| 6,209,219 B1 | 4/2001 | Wakefield |
| D441,308 S | 5/2001 | Davis |
| D442,076 S | 5/2001 | Swanson |
| 6,237,243 B1 | 5/2001 | Cook |
| RE37,212 E | 6/2001 | Marshall |
| 6,243,964 B1 | 6/2001 | Murray |
| 6,249,986 B1 | 6/2001 | Murray |
| D447,069 S | 8/2001 | Budrow |
| 6,272,764 B1 | 8/2001 | Lin |

(56) References Cited

U.S. PATENT DOCUMENTS

| | | | |
|---|---|---|---|
| 6,276,071 B1 | 8/2001 | Khachatoorian |
| D447,712 S | 9/2001 | Hsu |
| 6,282,808 B1 | 9/2001 | Murray |
| 6,308,432 B1 | 10/2001 | Gilliam et al. |
| D451,041 S | 11/2001 | Chen |
| 6,324,769 B1 | 12/2001 | Murray |
| 6,338,204 B1 | 1/2002 | Howle |
| D453,303 S | 2/2002 | Lin |
| 6,349,482 B1 | 2/2002 | Gilliam |
| 6,367,161 B1 | 4/2002 | Murray et al. |
| D458,163 S | 6/2002 | Kang |
| D458,550 S | 6/2002 | Hsu |
| 6,431,486 B1 | 8/2002 | Lee |
| D463,300 S | 9/2002 | Li |
| 6,442,863 B1 | 9/2002 | Poineau et al. |
| 6,449,866 B1 | 9/2002 | Murray |
| D464,277 S | 10/2002 | Tarver |
| D464,579 S | 10/2002 | Martone |
| 6,470,582 B1 | 10/2002 | Renko |
| 6,470,590 B1 | 10/2002 | Lee |
| 6,490,809 B1 | 12/2002 | Li |
| 6,497,050 B1 | 12/2002 | Ricalde |
| 6,499,226 B1 | 12/2002 | Reda et al. |
| D469,704 S | 2/2003 | Williams et al. |
| RE38,032 E | 3/2003 | Butwin |
| D471,473 S | 3/2003 | Blackman et al. |
| D471,827 S | 3/2003 | Ranieri et al. |
| 6,530,159 B2 | 3/2003 | Tarver |
| 6,543,144 B1 | 4/2003 | Morin |
| 6,546,644 B2 | 4/2003 | Poineau et al. |
| D474,412 S | 5/2003 | Ichinose et al. |
| 6,568,099 B2 | 5/2003 | Bergeron |
| D476,913 S | 7/2003 | Blackman et al. |
| 6,595,451 B1 | 7/2003 | Kang et al. |
| 6,598,310 B1 | 7/2003 | Odachowski |
| 6,637,124 B2 | 10/2003 | Pederson |
| 6,637,126 B2 | 10/2003 | Balota |
| 6,643,947 B2 | 11/2003 | Murray |
| 6,651,354 B1 * | 11/2003 | Odachowski .................. 33/755 |
| D485,770 S | 1/2004 | Lee |
| D486,086 S | 2/2004 | Jueneman |
| 6,684,522 B2 | 2/2004 | Chilton |
| 6,688,010 B1 | 2/2004 | Schwaerzler |
| 6,691,426 B1 | 2/2004 | Lee et al. |
| 6,694,622 B2 | 2/2004 | Kim |
| 6,698,679 B1 | 3/2004 | Critelli et al. |
| 6,708,417 B1 * | 3/2004 | Wilkins .......................... 33/494 |
| 6,718,649 B1 | 4/2004 | Critelli et al. |
| 6,760,979 B1 | 7/2004 | Hsu |
| 6,796,052 B1 | 9/2004 | Lin |
| 6,804,899 B2 | 10/2004 | Murray |
| 6,811,109 B1 | 11/2004 | Blackman et al. |
| 6,836,975 B2 | 1/2005 | Lin |
| 6,839,981 B2 | 1/2005 | Rafter |
| 6,854,197 B2 | 2/2005 | Knight |
| D503,351 S | 3/2005 | Chen |
| D503,637 S | 4/2005 | Noel |
| D503,897 S | 4/2005 | Lin |
| 6,874,245 B2 | 4/2005 | Liu |
| D504,628 S | 5/2005 | Weeks et al. |
| D504,835 S | 5/2005 | Snider |
| D504,836 S | 5/2005 | Wang |
| 6,892,468 B2 | 5/2005 | Murray |
| 6,904,697 B2 | 6/2005 | Zars |
| D507,195 S | 7/2005 | Kondo et al. |
| 6,918,191 B2 | 7/2005 | Stauffer et al. |
| 6,920,700 B2 | 7/2005 | Ekdahl et al. |
| 6,931,734 B2 | 8/2005 | Elder et al. |
| 6,931,753 B2 | 8/2005 | Ryals et al. |
| 6,935,045 B2 | 8/2005 | Cubbedge |
| 6,938,354 B2 | 9/2005 | Worthington |
| 6,944,961 B2 | 9/2005 | Carroll |
| 6,959,499 B2 | 11/2005 | Bini |
| 6,962,002 B2 | 11/2005 | Panosian |
| D514,962 S | 2/2006 | Armendariz |
| 6,996,915 B2 | 2/2006 | Ricalde |
| 7,024,791 B2 | 4/2006 | Marshall et al. |
| D522,890 S | 6/2006 | Huang |
| 7,055,260 B1 | 6/2006 | Hoffman |
| 7,057,484 B2 | 6/2006 | Gilmore |
| 7,059,061 B2 | 6/2006 | French |
| 7,131,214 B1 | 11/2006 | Blackman et al. |
| 7,131,215 B2 | 11/2006 | Kang |
| D535,900 S | 1/2007 | McKinney |
| 7,159,331 B2 | 1/2007 | Critelli et al. |
| 7,168,182 B2 | 1/2007 | Kilpatrick et al. |
| 7,174,655 B1 | 2/2007 | Gibbons et al. |
| 7,174,656 B1 | 2/2007 | Smith |
| 7,178,257 B2 | 2/2007 | Kang et al. |
| 7,185,446 B1 | 3/2007 | King |
| D540,207 S | 4/2007 | Ikeda |
| 7,234,246 B1 | 6/2007 | Rhead |
| RE39,719 E | 7/2007 | Murray |
| D545,701 S | 7/2007 | Cooper |
| D547,681 S | 7/2007 | Nelson et al. |
| 7,240,439 B2 | 7/2007 | Critelli et al. |
| 7,284,339 B1 | 10/2007 | Campbell et al. |
| 7,299,565 B2 | 11/2007 | Marshall et al. |
| D557,155 S | 12/2007 | Sa'ar |
| D558,620 S | 1/2008 | Critelli et al. |
| D560,522 S | 1/2008 | Farnworth et al. |
| 7,334,344 B2 | 2/2008 | Scarborough |
| 7,343,694 B2 | 3/2008 | Erdfarb |
| D565,441 S | 4/2008 | Critelli |
| D565,442 S | 4/2008 | Critelli |
| 7,353,619 B2 | 4/2008 | Gibbons et al. |
| 7,363,723 B1 | 4/2008 | Peterson |
| 7,377,050 B2 | 5/2008 | Shute et al. |
| 7,398,604 B2 | 7/2008 | Murray |
| 7,406,778 B2 | 8/2008 | Lee et al. |
| 7,415,777 B2 | 8/2008 | Campbell et al. |
| 7,415,778 B1 | 8/2008 | McEwan et al. |
| D579,359 S | 10/2008 | Critelli et al. |
| 7,434,330 B2 | 10/2008 | McEwan et al. |
| 7,454,845 B2 | 11/2008 | Wise |
| D582,810 S | 12/2008 | Cook |
| 7,458,537 B2 | 12/2008 | Critelli et al. |
| 7,475,842 B2 | 1/2009 | Campbell |
| 7,487,600 B1 | 2/2009 | Cooper |
| 7,490,414 B2 | 2/2009 | Critelli et al. |
| 7,490,415 B1 | 2/2009 | Cubbedge |
| D590,283 S | 4/2009 | Critelli et al. |
| D590,284 S | 4/2009 | Critelli et al. |
| 7,555,845 B2 | 7/2009 | Critelli et al. |
| 7,559,154 B2 | 7/2009 | Levine et al. |
| 7,565,751 B2 | 7/2009 | Murray |
| 7,594,341 B2 | 9/2009 | Erdfarb |
| D603,248 S | 11/2009 | Bar-Erez |
| 7,617,616 B1 | 11/2009 | Berg |
| 7,627,958 B2 | 12/2009 | Tallon et al. |
| 7,631,437 B2 | 12/2009 | Sanderson |
| D611,849 S | 3/2010 | Cook et al. |
| 7,669,347 B1 | 3/2010 | Huang |
| D613,629 S | 4/2010 | Suzuki |
| D614,516 S | 4/2010 | Capra |
| 7,703,216 B2 | 4/2010 | Huang |
| D617,224 S | 6/2010 | Delneo et al. |
| 7,805,855 B2 | 10/2010 | Seo |
| 7,845,093 B2 | 12/2010 | Smiroldo |
| 7,846,673 B2 | 12/2010 | Pastorek et al. |
| 7,854,074 B2 | 12/2010 | Zhou |
| 7,913,406 B2 | 3/2011 | Norelli |
| 7,918,037 B1 | 4/2011 | Polkhovskiy |
| 7,987,611 B2 | 8/2011 | Taylor |
| 8,015,723 B2 | 9/2011 | Solomon |
| 8,056,849 B2 | 11/2011 | Ng et al. |
| 8,081,815 B2 | 12/2011 | Kotake |
| D653,974 S | 2/2012 | Capra |
| 8,117,762 B2 | 2/2012 | Delneo et al. |
| 8,117,763 B2 | 2/2012 | Delneo et al. |
| D660,735 S | 5/2012 | Petrillo |
| 8,215,027 B2 | 7/2012 | Kang |
| 8,375,595 B2 | 2/2013 | Murray et al. |
| 8,381,411 B2 | 2/2013 | Delarosa et al. |

(56) References Cited

U.S. PATENT DOCUMENTS

| | | | |
|---|---|---|---|
| 8,407,909 B2 | 4/2013 | Lindsay | |
| 2001/0003872 A1 | 6/2001 | Pederson | |
| 2001/0042315 A1 | 11/2001 | Dixon | |
| 2002/0011008 A1 | 1/2002 | Nelson et al. | |
| 2002/0066193 A1 | 6/2002 | Hodge | |
| 2002/0066774 A1 | 6/2002 | Prochac | |
| 2002/0073570 A1 | 6/2002 | Conder | |
| 2003/0009899 A1 | 1/2003 | Ha | |
| 2003/0019116 A1 | 1/2003 | DeWall | |
| 2003/0019123 A1 | 1/2003 | Lin | |
| 2003/0070315 A1 | 4/2003 | Bergeron | |
| 2003/0126752 A1* | 7/2003 | Brandon et al. | 33/494 |
| 2003/0213141 A1 | 11/2003 | Lin | |
| 2003/0233762 A1 | 12/2003 | Blackman et al. | |
| 2004/0044438 A1 | 3/2004 | Lorraine et al. | |
| 2004/0055174 A1 | 3/2004 | Hirsch, Jr. | |
| 2004/0071869 A1 | 4/2004 | Gilliam et al. | |
| 2004/0088875 A1 | 5/2004 | Lee et al. | |
| 2004/0163267 A1 | 8/2004 | Bini | |
| 2004/0163271 A1 | 8/2004 | Zars | |
| 2004/0163272 A1 | 8/2004 | Knight | |
| 2005/0005470 A1 | 1/2005 | Snider | |
| 2005/0028396 A1 | 2/2005 | Stauffer et al. | |
| 2005/0155244 A1 | 7/2005 | Ryals et al. | |
| 2005/0155245 A1 | 7/2005 | Panosian | |
| 2005/0166417 A1* | 8/2005 | Clapper | 33/759 |
| 2005/0252020 A1 | 11/2005 | Critelli et al. | |
| 2005/0252021 A1 | 11/2005 | Kang | |
| 2006/0010705 A1 | 1/2006 | Dettellis | |
| 2006/0096112 A1 | 5/2006 | Berring | |
| 2006/0096113 A1 | 5/2006 | Kang | |
| 2006/0107546 A1 | 5/2006 | Pritchard | |
| 2006/0130352 A1 | 6/2006 | Huang | |
| 2006/0185185 A1 | 8/2006 | Scarborough | |
| 2006/0230627 A1 | 10/2006 | Blackman et al. | |
| 2006/0248742 A1 | 11/2006 | Marshall et al. | |
| 2006/0283036 A1 | 12/2006 | Huang | |
| 2007/0017111 A1 | 1/2007 | Hoback et al. | |
| 2007/0056182 A1 | 3/2007 | Di Bitonto et al. | |
| 2007/0079520 A1 | 4/2007 | Levine et al. | |
| 2007/0152091 A1 | 7/2007 | Campbell | |
| 2007/0171630 A1 | 7/2007 | Gibbons et al. | |
| 2007/0227028 A1 | 10/2007 | Campbell et al. | |
| 2008/0028628 A1 | 2/2008 | Campbell et al. | |
| 2008/0086902 A1 | 4/2008 | Murray | |
| 2008/0086903 A1 | 4/2008 | Peterson | |
| 2008/0086904 A1 | 4/2008 | Murray | |
| 2008/0285854 A1 | 11/2008 | Kotake et al. | |
| 2009/0064517 A1 | 3/2009 | Sanderson | |
| 2009/0064525 A1 | 3/2009 | Chen | |
| 2009/0064526 A1 | 3/2009 | Farnworth et al. | |
| 2009/0139106 A1* | 6/2009 | Delaurier | 33/759 |
| 2009/0249636 A1 | 10/2009 | Reda et al. | |
| 2010/0139110 A1 | 6/2010 | Germain | |
| 2010/0314277 A1 | 12/2010 | Murray | |
| 2010/0325910 A1 | 12/2010 | Huang | |
| 2011/0005094 A1 | 1/2011 | Solomon | |
| 2011/0138642 A1 | 6/2011 | Norelli | |
| 2011/0179661 A1 | 7/2011 | Delneo et al. | |
| 2011/0179663 A1 | 7/2011 | Kang | |
| 2011/0179664 A1 | 7/2011 | Delneo et al. | |
| 2012/0036727 A1 | 2/2012 | McCarthy | |
| 2012/0055038 A1 | 3/2012 | Lindsay | |
| 2012/0073156 A1 | 3/2012 | Delarosa et al. | |
| 2012/0159799 A1 | 6/2012 | Murray et al. | |
| 2012/0167403 A1 | 7/2012 | Roeske | |
| 2013/0025147 A1 | 1/2013 | Steele et al. | |
| 2013/0025148 A1 | 1/2013 | Steele et al. | |
| 2013/0185949 A1 | 7/2013 | Burch et al. | |
| 2014/0101952 A1* | 4/2014 | Schmitten | 33/494 |
| 2014/0109424 A1* | 4/2014 | Leff et al. | 33/755 |

FOREIGN PATENT DOCUMENTS

| | | |
|---|---|---|
| EP | 0199430 | 10/1986 |
| EP | 531570 | 3/1993 |
| EP | 427932 | 2/1996 |
| EP | 0724133 | 7/1996 |
| EP | 0896200 A2 | 2/1999 |
| EP | 0896200 A3 | 12/1999 |
| EP | 1074813 | 2/2001 |
| EP | 1175840 | 1/2002 |
| EP | 1411319 | 4/2004 |
| EP | 1144947 | 9/2004 |
| EP | 1469276 | 10/2004 |
| EP | 1104542 | 12/2004 |
| EP | 1553382 | 7/2005 |
| EP | 0922196 | 11/2005 |
| EP | 1647797 | 4/2006 |
| EP | 1237431 | 10/2006 |
| EP | 1914508 | 4/2008 |
| EP | 1914509 | 4/2008 |
| EP | 2469218 | 6/2012 |
| GB | 690458 | 4/1953 |
| JP | 1961002384 | 2/1961 |
| JP | 1983134704 | 9/1983 |
| JP | 10332301 | 12/1998 |
| KR | 19840001901 | 9/1984 |
| KR | 19910004712 | 11/1991 |
| KR | 102006058396 A1 | 7/2008 |
| KR | 102006058396 B4 | 6/2011 |
| WO | WO 9402799 | 2/1994 |
| WO | WO 9714541 | 4/1997 |
| WO | WO 98/09133 | 3/1998 |
| WO | WO 9811402 | 3/1998 |
| WO | WO 98/23524 | 6/1998 |
| WO | WO 99/23447 | 5/1999 |
| WO | WO 00/09969 | 2/2000 |
| WO | WO 0060306 | 10/2000 |
| WO | WO 02057710 | 7/2002 |
| WO | WO 03/031903 | 4/2003 |
| WO | WO 2005/008171 | 1/2005 |
| WO | WO 2007/059353 | 5/2007 |
| WO | WO 2007/059354 | 5/2007 |
| WO | WO 2007/126960 | 11/2007 |

* cited by examiner

TAPE MEASURE

This application claims priority to U.S. Provisional Patent Application No. 61/527,964, filed on Aug. 26, 2011, the entire contents of which are incorporated by reference herein.

BACKGROUND

The present invention relates to measurement devices, and in particular, the invention relates to a tape measure.

SUMMARY

In one embodiment, the invention provides a tape measure. The tape measure includes a housing assembly defining a cavity and a tape port. A measuring tape is selectively extendable and retractable from the tape port. The measuring tape includes a spool portion disposed within the cavity and an end portion. A top surface extends from the end portion to the spool portion, and a bottom surface extends from the end portion to the spool portion opposite the top surface. A hook member is fixedly coupled to a end portion of the measuring tape. A first measurement scale is defined on the top surface and includes indicia having a first orientation relative to a longitudinal tape axis. The bottom surface includes a second measurement scale with indicia having a second orientation relative to the longitudinal tape axis. The second orientation is substantially opposite the first orientation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
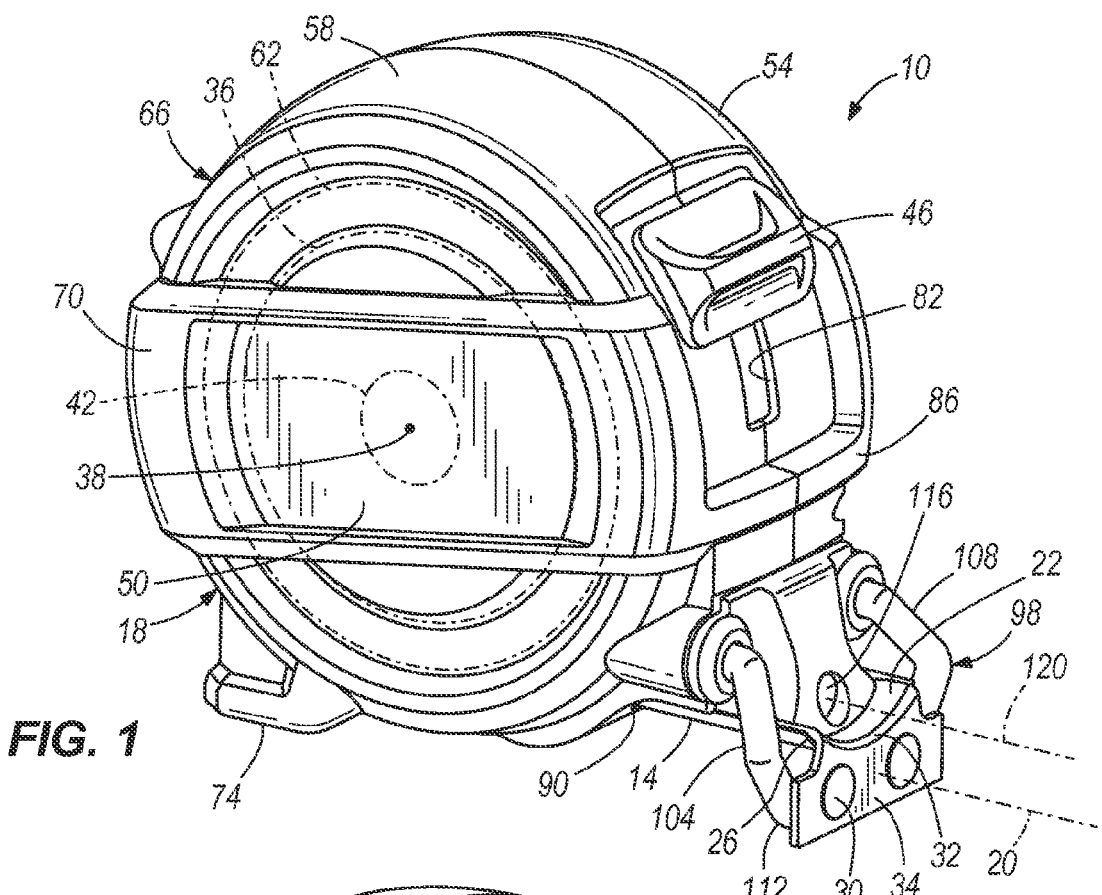
FIG. 1 is a perspective view of a tape measure according to one construction of the invention.

FIGS. 1-4 illustrate a length measurement device, more specifically, a tape measure 10. Referring to FIG. 1, the tape measure 10 includes a coilable measuring tape 14 and a housing assembly 18.

The measuring tape 14 is retractable and extendable from the housing assembly 18 along a tape axis 20. A hook member 22 is fixedly coupled to an end portion 26 of the measuring tape 14. Magnets 30 are coupled to a vertical face 32 of the hook member 22. The magnets 30 may be coupled to the vertical face 32 by a rivet, a press-fit, an adhesive, or other fastening means. Additionally, an over-coating 34 may be applied to the hook member 22 and magnets 30. The over-coating 34 may be a paint, an epoxy-resin, tape or other coating type. The over-coating 34 assists in protecting the magnets 30 and hook member 22 from scratches and dirt, while also aiding retention of the magnets 30 to the hook member 22.

The remainder of the measuring tape 14 forms a spool 36 rotatably disposed about an axis 38 of the tape measure 10. A retraction mechanism 42 is coupled to the spool 36 to provide for powered refraction of the measuring tape 14. The retraction mechanism 42 may include an elongated coiled spring for motive force. A tape lock 46 is provided to selectively engage at least one of the spool 36, the retraction mechanism 42, or the tape 14 such that a segment of the measuring tape 14 remains extended a desired length beyond the housing.

The housing assembly 18 includes a first side wall 50, a second side wall 54, and a peripheral wall 58 connecting the first side wall 50 and the second side wall 54. The first side wall 50, second side wall 54, and peripheral wall 58 define an internal cavity 62 in which the spool 36 and retraction mechanism 42 are housed. In the illustrated construction, each of the first side wall 50 and the second side wall 54 has a substantially circular profile 66. In other embodiments, the side walls 50 and 54 may be rectangular or another polygonal shape. Portions of the housing assembly 18 may be co-molded or separately formed of a resilient material, such as a natural or synthetic rubber, forming housing bumpers 70. A support leg 74 extends from a lower portion 78 of the peripheral wall 58.

With continued reference to FIG. 1, a slot 82 is defined along a forward portion 86 of the peripheral wall 58. The slot 82 is provided to allow for sliding movement of the tape lock 46 relative to the housing assembly 18.

Below the slot 82, a tape port 90 is provided in the peripheral wall 58. The tape port 90 has an arcuate shape, corresponding to an arcuate cross-sectional profile of the measuring tape 14. The tape port 90 allows for the retraction and extension of the measuring tape 14 to and from the internal cavity 62. A brush or foam wiper member may be provided adjacent the tape port 90 for wiping dirt and debris from the tape 14 when retracting. The wiper member thus reduces the likelihood of the retraction mechanism 42 becoming fouled.

A guard member 98 is coupled to the housing assembly 18 adjacent the tape port 90. The guard member 98 is U-shaped, with a first leg 104 coupled to the first side wall 50, a second leg 108 coupled to the second side wall 54, and a connecting leg 112 extending between the first leg 104 and the second leg 108. The guard member 98, more specifically the connecting leg 112, is configured to engage the hook member 22 when the measuring tape 14 is fully retracted.

The guard member 98 shields a user's fingers from being struck by the hook member 22 when the measuring tape 14 is rapidly retracted into the internal cavity 62. The guard member 98 also shields the housing assembly from being struck by the hook member 22. In addition, a lower surface 116 of the guard member 98 is substantially aligned with the support leg 74, thereby allowing the tape measure 10 to stand upright on a surface to be measured. In some constructions, the guard member 98 may be formed of a resilient polymer, while in other constructions the guard member may be a substantially rigid material such as a metal, with other materials, combinations of materials, and constructions being possible.

In the illustrated construction of the tape measure 10, a laser 116 is coupled to the peripheral wall 58 between the first leg 104 and the second leg 108. The laser 116 has an illumination axis 120 substantially parallel with the tape axis 20. The laser 116 may be used as a pointer or for illumination of a line of measurement, plumb line, or other purpose. In some constructions, the laser may be a laser rangefinder for distance measurement.

Figure 2:
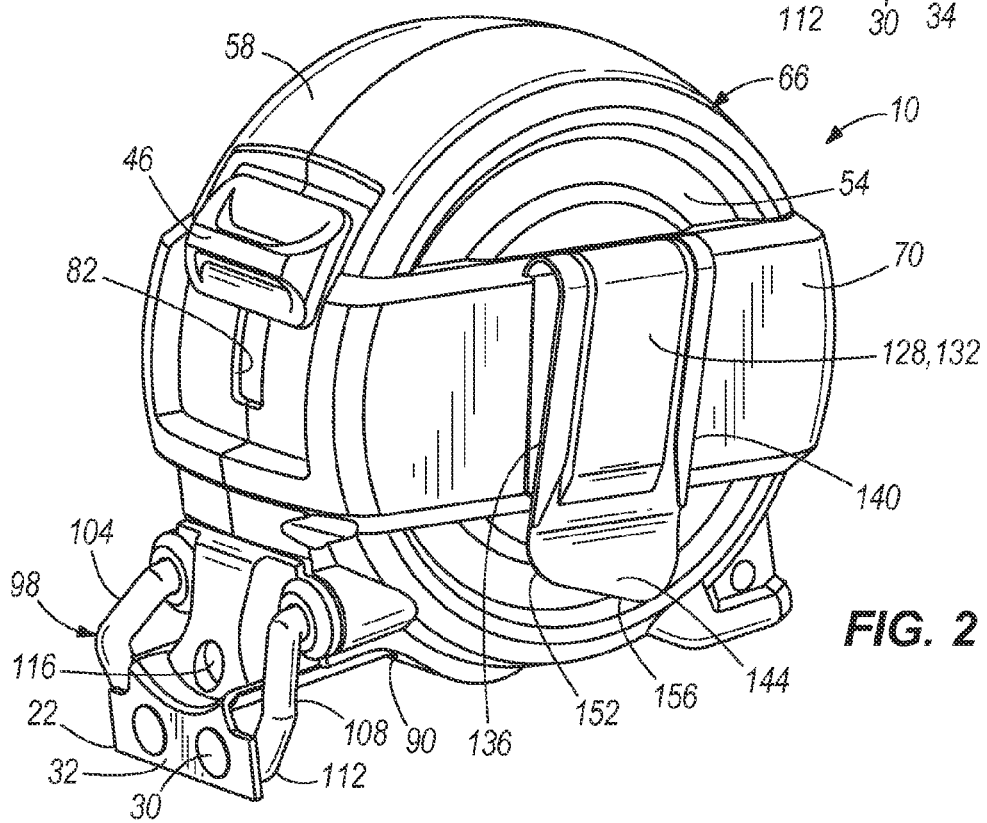
FIG. 2 is an opposite perspective view of the tape measure of FIG. 1.

As illustrated in FIG. 2, a resilient clip member 128 is fixedly coupled to the second side wall 54 of the housing assembly 18. The illustrated clip member 128 is unitarily formed of sheet metal. An outer wall 132 of the clip member 128 is defined by forward edge 136, a rear edge 140, and a bottom portion 144. The forward edge 136 and rear edge 140 are formed by rolling a portion of the outer wall 132 upon itself, resulting in smooth, rounded edge surfaces at 136 and 140. The bottom portion 144 of the outer wall 132 includes radiused corners 152 and an outwardly flared, angled bottom edge 156. The smooth, rounded edge surfaces 148, radiused corners 152, and outwardly flared, angled bottom edge 156 allow a user to more easily insert the clip member 128 into a pocket or over a belt.

Figure 3:
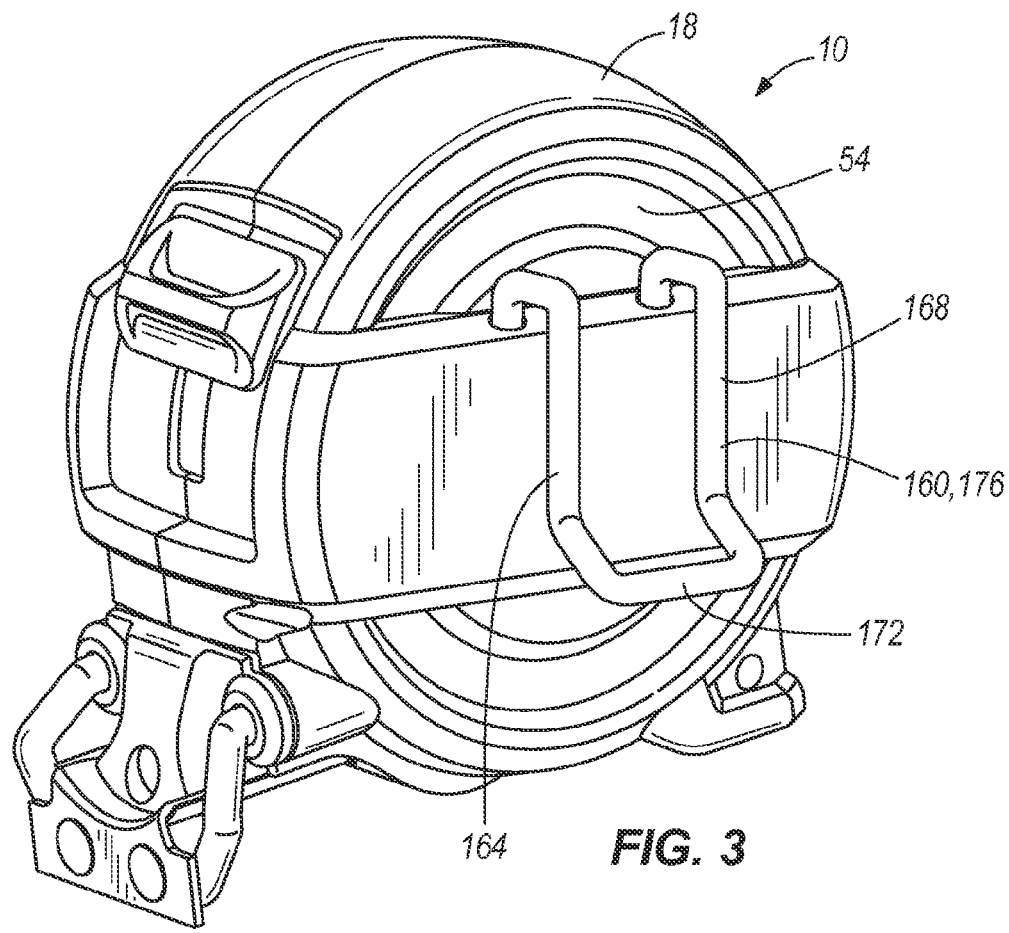
FIG. 3 is an opposite perspective view of the tape measure of FIG. 1, according to another construction of the invention.

FIG. 3 illustrates an alternative construction of a resilient clip member 160 fixedly coupled to the second side wall 54 of the housing 18. The resilient clip member 160 is generally U-shaped, with a first clip leg 164 and a second clip leg 168 coupled to the second side wall 58. A clip bottom leg 172 extends between the first clip leg 164 and the second clip leg 168. The clip bottom leg 172 is outwardly flared from the second side wall 54 to allow for smooth engagement of the clip 160 with a pant pocket or belt. The entire resilient clip member 160 has a substantially uniform, rounded cross section 176, and may be formed of wire or unitarily molded of a resilient polymer.

Figure 4:
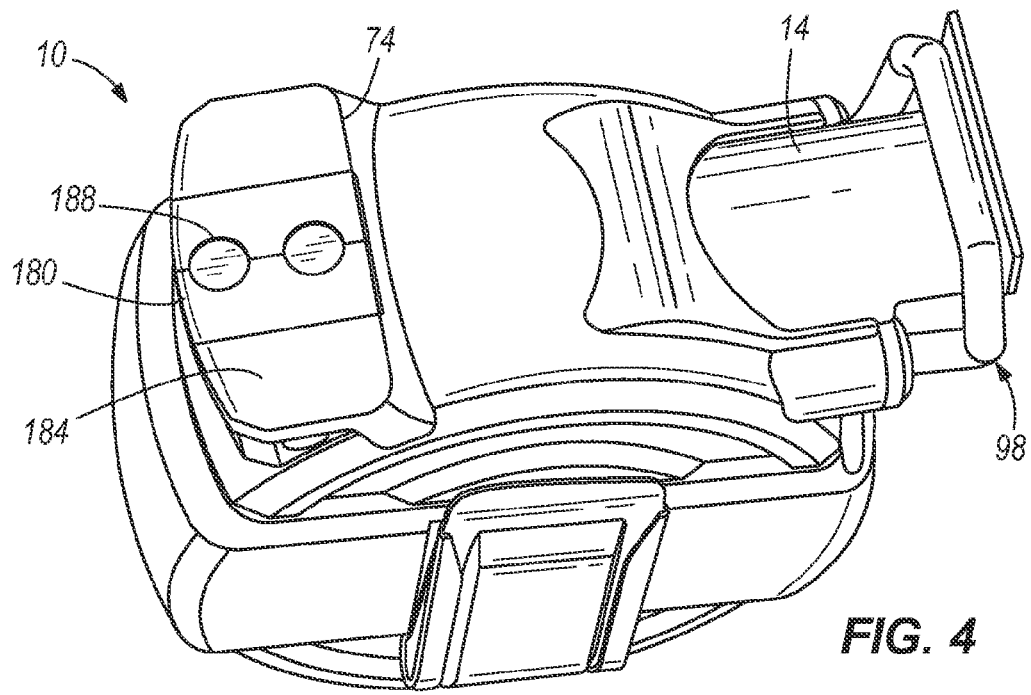
FIG. 4 is a bottom perspective view of the tape measure of FIG. 1.

Referring to FIG. 4, a substantially V-shaped channel 180 is defined in a bottom surface 184 of the support leg 74. Portions of the V-shaped channel 180 include recessed magnetic elements 188. In some embodiments, the V-shaped channel 180 may be defined in a separately formed metallic insert coupled to the support leg. The metallic insert may itself be magnetic, or magnetic elements may be coupled to the metallic insert. The V-shaped channel 180 is provided to engage and partially receive circular-cross section work pieces such as pipes and conduits. The V-shaped channel 180 aides in maintaining the tape axis 20 (FIG. 1) substantially aligned with a longitudinal axis of the workpiece. Where the workpiece is ferromagnetic, the magnetic elements 188 detachably couple the tape measure to the workpiece for enhanced ease in taking measurements.

Figure 5:
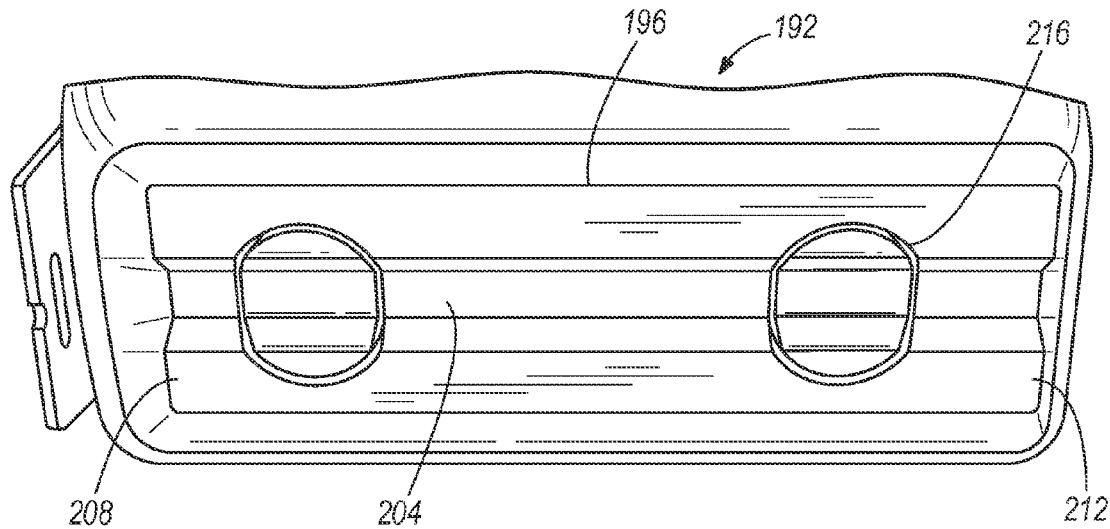
FIG. 5 is a bottom perspective view of a tape measure according to another construction of the invention.

FIG. 5 illustrates an alternative construction of a tape measure 192. More specifically, FIG. 5 illustrates a bottom surface 196 of the tape measure 192. A V-shaped channel 204 is defined in the bottom surface 196 from a first end 208 to a second end 212 of the bottom surface 196. Magnet elements 216 are coupled to the bottom surface 196 within the V-shaped channel 204. The bottom surface 196 is knurled adjacent the V-shaped channel 204 to provide additional grip when engaging a work surface.

Figure 6:
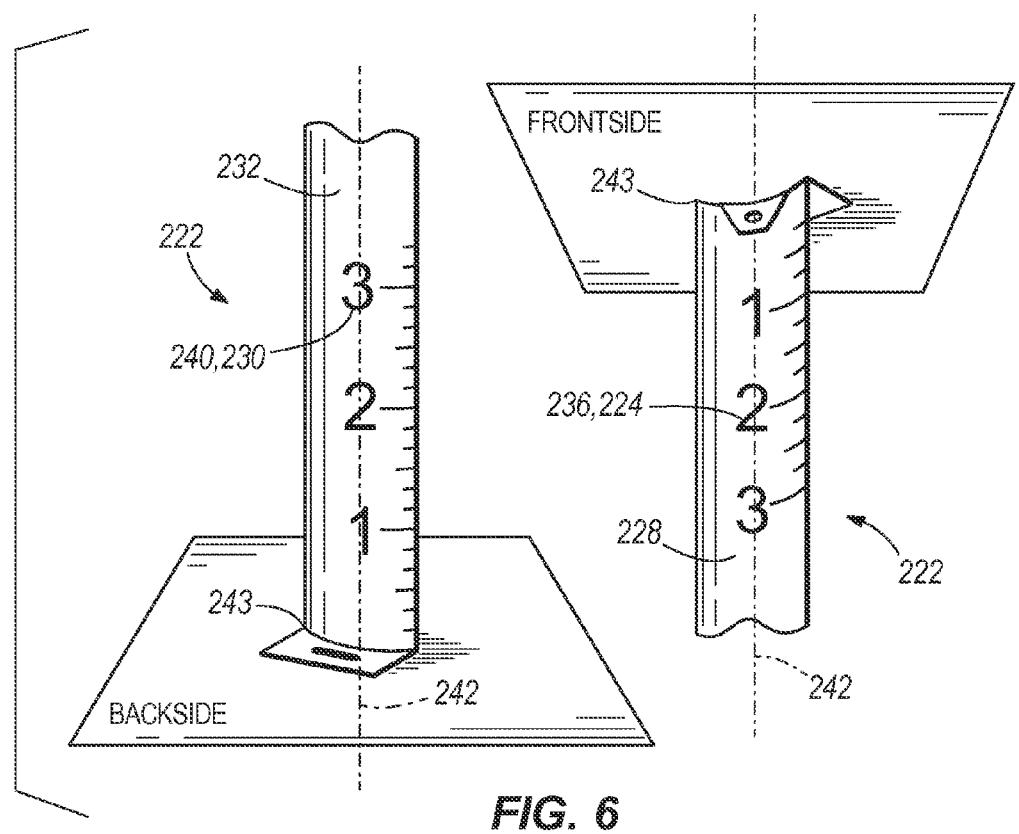
FIG. 6 is a perspective view of a front side and back side of a measuring tape according to another aspect of the invention.

FIG. 6 illustrates a portion of a measuring tape 222 from opposing perspectives. The measuring tape 222 includes a first measurement scale 224 (e.g., in inches) on a front side 228 (or top) and a second measurement scale 230 on a back side 232 (or bottom). The first measurement scale 224 on the front side 228 and the second measurement scale 230 on the back side 232 having opposing orientations 236 and 240 relative to a longitudinal axis 242, such that a user may read measurements more easily from a variety of viewing positions. The first measurement scale 224 and the second measurement scale 230 each begin at an end portion 243 of the measuring tape 222. In the illustrated construction, the scale 224 includes numbers arranged vertically with the bottom of each number being further from the hook 22 than the top of the number. The scale 240 has the opposite orientation with the numbers arranged vertically such that the bottom of each number is nearer to the hook 22 than the top of the number. Of course, other constructions could reverse these orientations or use other orientations such as one in which the numbers of both orientations are rotated 90 degrees.

Figure 7:
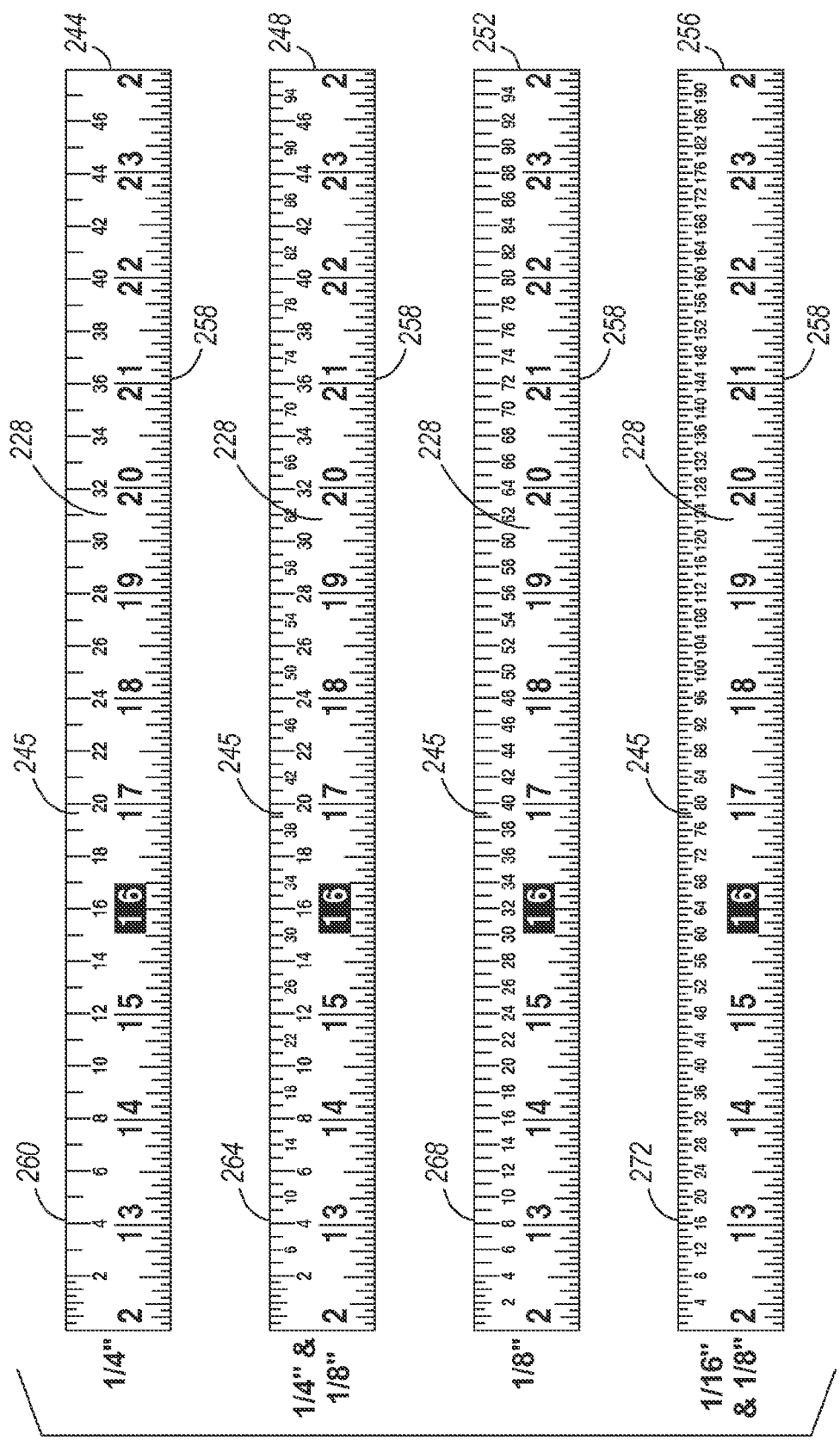
FIG. 7 is a top view of various measuring scales applied to portions of a measuring tape according to yet another aspect of the invention.

FIG. 7 illustrates center portions 245 of four measuring tapes 244, 248, 252, and 256. Each illustrated center portion 245 is between the 12 inch and 24 inch indicia of a first measurement scale 258. The center portion 245 is axially offset from the distal end (not shown) of each measuring tape (e.g., the center portion 245 begins at the 12 inch mark and extends to the 24 inch mark). Each of the measuring tapes 244, 248, 252, and 256 also include third measurement scales 260, 264, 268, and 272 (e.g., architectural scales) defined on either the front side 228 or the back side 232 of the measuring tape 222. FIG. 6 illustrates such a scale on the front side 228. As shown in FIG. 7, the third measurement scales are provided, for example, to measure dimensions on a scaled print and are subscales of the first measurement scale. The third measurement scale 260 is provided in ¼ inch increments. The third measurement scale 264 is provided in a combination of ¼ inch and ⅛ inch increments. The third measurement scale 268 is provided in ⅛ inch increments. The third measurement scale 272 is provided in 1/16 inch increments.

Various features and advantages of the invention are set forth in the following claims.

The invention claimed is:

1. A tape measure comprising:
a housing assembly defining a cavity and a tape port;
a measuring tape selectively extendable and retractable from the tape port, the measuring tape having a spool portion disposed within the cavity and an end portion, the measuring tape defining a top surface extending from the end portion to the spool portion, and a bottom surface extending from the end portion to the spool portion opposite the top surface; and
a hook member fixedly coupled to a end portion of the measuring tape;
a first measurement scale defined on the top surface and including indicia having a first orientation relative to a longitudinal tape axis;
a second measurement scale defined on the bottom surface and including indicia having a second orientation relative to the longitudinal tape axis, the second orientation being substantially opposite the first orientation.

2. The tape measure of claim 1, further comprising a third measurement scale defined on one of the top surface and the bottom surface.

3. The tape measure of claim 2, wherein the third measurement scale is defined in a center portion of the tape that is axially offset from the end portion.

4. The tape measure of claim 3, wherein the center portion of the measuring tape is defined between approximately a 12 inch marking and approximately a 24 inch marking of the first measurement scale.

5. The tape measure of claim 2, wherein the third measurement scale is a subscale of the first measurement scale.

6. The tape measure of claim 5, wherein the third measurement scale includes a ¼ inch subscale.

7. The tape measure of claim 5, wherein the third measurement scale includes a ⅛ inch subscale.

8. The tape measure of claim 5, wherein the third measurement scale includes a 1/16 inch subscale.

9. The tape measure of claim 1, wherein the first measurement scale and the second measurement scale each begin at the end portion of the measuring tape.

10. The tape measure of claim 1, wherein the longitudinal axis is disposed midway between a first lateral edge and a second lateral edge of the tape, the first measurement scale is disposed between the longitudinal axis and the first lateral edge, and a third measurement scale is disposed between the longitudinal axis and the second lateral edge.

11. The tape measure of claim 1, wherein the first measurement scale includes a first plurality of numbers each having a first top and a first bottom, the first numbers arranged vertically along the longitudinal tape axis such that for each first number, the first bottom is nearer to the hook member than the first top.

12. The tape measure of claim 11, wherein the second measurement scale includes a second plurality of numbers each having a second top and a second bottom, the second numbers arranged vertically along the longitudinal tape axis such that for each second number, the second top is nearer to the hook member than the second bottom.

\* \* \* \* \*

UNITED STATES PATENT AND TRADEMARK OFFICE
CERTIFICATE OF CORRECTION

PATENT NO. : 8,863,399 B2  Page 1 of 1
APPLICATION NO. : 13/594331
DATED : October 21, 2014
INVENTOR(S) : Michael S. Steele et al.

It is certified that error appears in the above-identified patent and that said Letters Patent is hereby corrected as shown below:

Title Page, Item (56) References Cited

Page 4, Col. 2, Replace "KR102006058396A1" with --DE102006058396A1--
Page 4, Col. 2, Replace "KR102006058396B4" with --DE102006058396B4--

Signed and Sealed this
Fourteenth Day of April, 2015

Michelle K. Lee
*Director of the United States Patent and Trademark Office*